United States Patent
Krishnamoorthy

(10) Patent No.: US 10,382,823 B2
(45) Date of Patent: Aug. 13, 2019

(54) VIDEO CONTENT DEEP DIVING

(71) Applicant: Oath Inc., New York, NY (US)

(72) Inventor: Parameswaran Thrissur Krishnamoorthy, Sunnyvale, CA (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 15/082,334

(22) Filed: Mar. 28, 2016

(65) Prior Publication Data

US 2017/0280198 A1    Sep. 28, 2017

(51) Int. Cl.

| H04N 21/4725 | (2011.01) |
|---|---|
| H04N 21/81 | (2011.01) |
| H04N 21/431 | (2011.01) |
| H04N 21/433 | (2011.01) |
| H04N 21/472 | (2011.01) |
| H04N 21/4782 | (2011.01) |
| H04N 21/4788 | (2011.01) |
| H04N 21/478 | (2011.01) |
| H04N 21/45 | (2011.01) |
| H04N 21/858 | (2011.01) |
| H04N 21/8545 | (2011.01) |
| H04N 21/44 | (2011.01) |

(52) U.S. Cl.
CPC ..... *H04N 21/4725* (2013.01); *H04N 21/4316* (2013.01); *H04N 21/4333* (2013.01); *H04N 21/44008* (2013.01); *H04N 21/4532* (2013.01); *H04N 21/4782* (2013.01); *H04N 21/4788* (2013.01); *H04N 21/47217* (2013.01); *H04N 21/47815* (2013.01); *H04N 21/8133* (2013.01); *H04N 21/858* (2013.01); *H04N 21/8545* (2013.01)

(58) Field of Classification Search
CPC ........... H04N 21/4725; H04N 21/8133; H04N 21/4316; H04N 21/4333; H04N 21/47217; H04N 21/4782; H04N 21/4788; H04N 21/47815; H04N 21/4532; H04N 21/858; H04N 21/8545; H04N 21/44008

See application file for complete search history.

(56) References Cited

U.S. PATENT DOCUMENTS

| 5,987,509 A | 11/1999 | Portuesi | |
|---|---|---|---|
| 2003/0131357 A1* | 7/2003 | Kim | H04N 5/445 725/60 |
| 2007/0060112 A1* | 3/2007 | Reimer | G06F 17/30026 455/414.2 |

(Continued)

*Primary Examiner* — Oschta I Montoya
(74) *Attorney, Agent, or Firm* — Cooper Legal Group, LLC

(57) ABSTRACT

One or more computing devices, systems, and/or methods for displaying content associated with a video element of a video are provided. For example, a video may comprise video elements (e.g., pixels of frames of the video depicting an entity such as a car, an actor, a monument, etc.) that are tagged with content tags (e.g., a textual string such as a search query used to obtain content from content providers). When a user interacts with the video element (e.g., a touch gesture, such as a pressure sensitive gesture, on a video element depicting the actor), content associated with a content tag used to tag the video element may be retrieved (e.g., an image, a social network profile, search results, and/or other content associated with the actor). In this way, the content may be provided to the user for further action or learning about the entity depicted by the video element.

20 Claims, 12 Drawing Sheets

(56) References Cited

U.S. PATENT DOCUMENTS

| | | | |
|---|---|---|---|
| 2009/0327894 A1* | 12/2009 | Rakib | G11B 27/34 |
| | | | 715/719 |
| 2010/0077428 A1* | 3/2010 | Arnold | H04N 7/17318 |
| | | | 725/34 |
| 2011/0283309 A1* | 11/2011 | Bliss | H04N 21/4532 |
| | | | 725/25 |
| 2012/0167146 A1 | 6/2012 | Incorvia | |
| 2014/0007159 A1 | 1/2014 | Garzoni et al. | |
| 2014/0222802 A1* | 8/2014 | Yan | G06F 17/30554 |
| | | | 707/727 |
| 2015/0020096 A1* | 1/2015 | Walker | G06T 11/206 |
| | | | 725/34 |
| 2015/0089384 A1* | 3/2015 | Lewis | G06F 17/3089 |
| | | | 715/745 |
| 2015/0212977 A1* | 7/2015 | Dasgupta | G06F 17/211 |
| | | | 715/254 |
| 2016/0014461 A1* | 1/2016 | Leech | H04N 21/4668 |
| | | | 725/14 |
| 2016/0179343 A1* | 6/2016 | Shein | G06F 3/04817 |
| | | | 715/760 |
| 2016/0360289 A1* | 12/2016 | Santoro | H04N 21/812 |

* cited by examiner

VIDEO CONTENT DEEP DIVING

BACKGROUND

Many users consume content through videos. In an example, a user of a smartphone may watch a movie trailer provided by a movie streaming service. In another example, a user of a tablet may watch a soccer game clip provided by a news website. Videos may depict various entities, such as people (e.g., a sports figure, an actor, a politician, etc.), places (e.g., a beach resort, a restaurant district of a city, etc.), and/or things (e.g., a consumer good, a car, a monument, a business, etc.). While watching a comedy video, a user may see something of interest, such as a particular monument that the user would like to identify and learning more about. If the user continues to watch the video without taking further action, the user may forget about the monument. Also, the video may not explain about the monument (e.g., the monument may be merely background in a scene of the comedy movie), and thus the user may not know the identity or location of the monument for further research. Thus, the user may forgo learning about the monument because the user does not have enough information to further research the monument.

SUMMARY

In accordance with the present disclosure, one or more computing devices and/or methods for displaying content associated with a video element of a video are provided. For example, a video may be displayed through a video player interface of a computing device (e.g., a news report video about a music festival). The video may comprise one or more video elements tagged with content tags (e.g., pixels of a frame of the news report video depicting a rock band entity tagged with a "Rock Band X" content tag; pixels of the frame of the news report video depicting a festival location entity tagged with a "Musica Stage in Seattle" content tag; etc.). A user interaction with a video element of the video may be received (e.g., the user may perform a gesture, such as a touch gesture, a pressure sensitive gesture corresponding to an amount of pressure/force that is applied to a contact area of a touch display such as by an input object or finger, etc., over a depiction of the festival location, such as while the news report video is playing or paused). A content tag, used to tag the video element, may be identified (e.g., the "Musica Stage in Seattle" content tag may be retrieved such as from metadata of the video). Content, associated with the content tag, may be retrieved. For example, videos, user photos, images, search results from a search engine (e.g., "Musica Stage in Seattle" may be used as a search query), a social network profile of the Musica Stage, an action completion interface used to sign up for concert event emails, a map of an area surrounding the Musica Stage, a purchase interface used to purchase tickets, and/or other content associated with the Musica Stage may be retrieved from various content providers. The content may be displayed through the computing device (e.g., through a content interface overlaying, partially overlaying, or not overlaying the video player interface).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
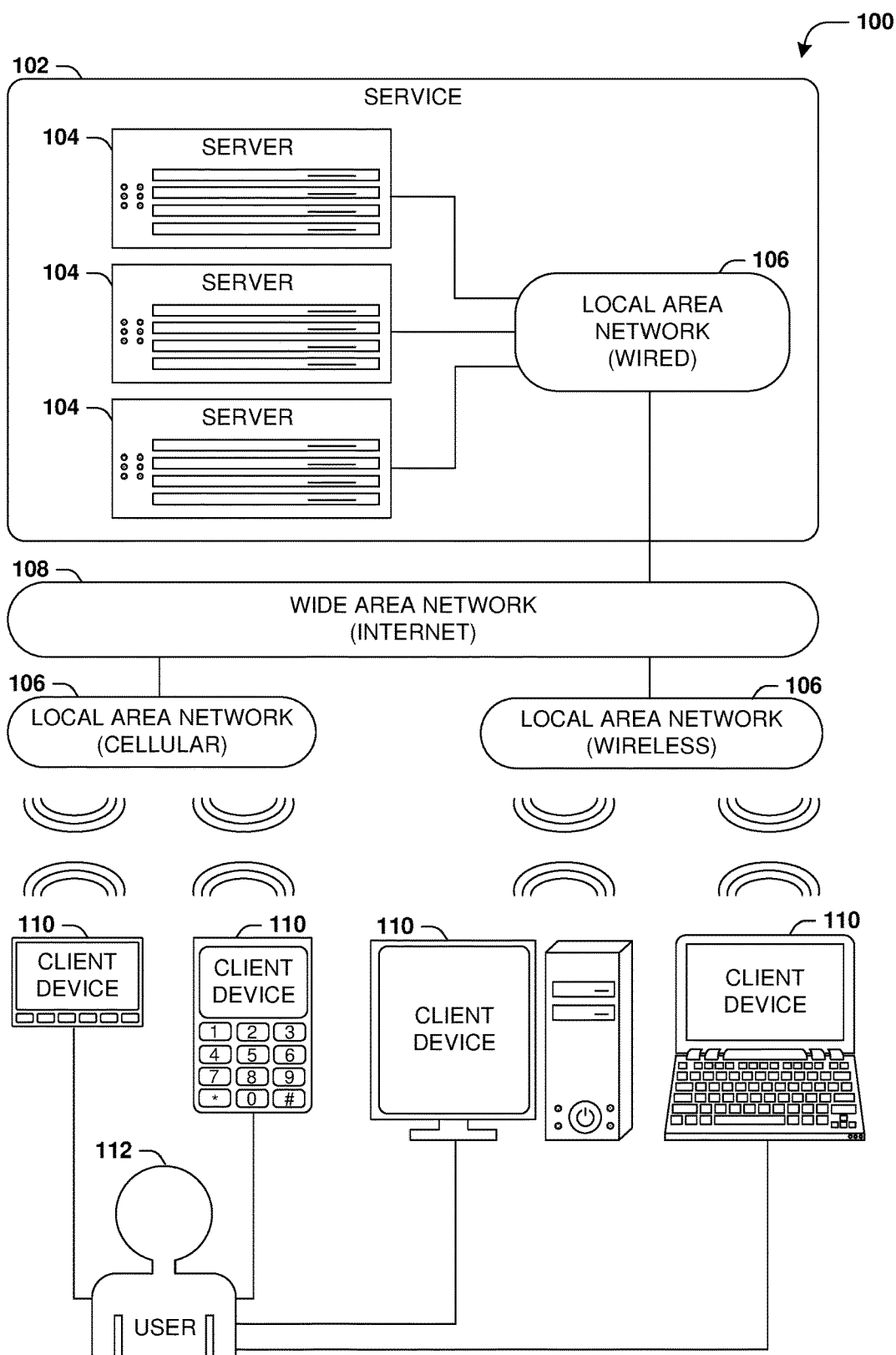
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
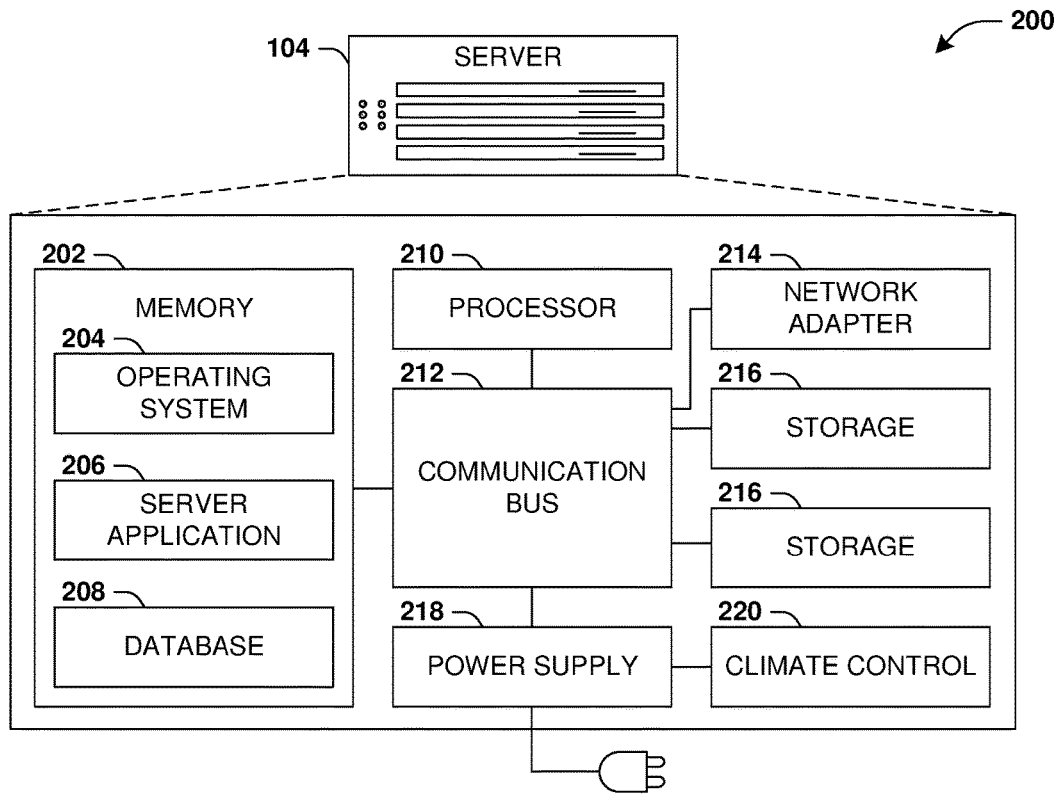
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
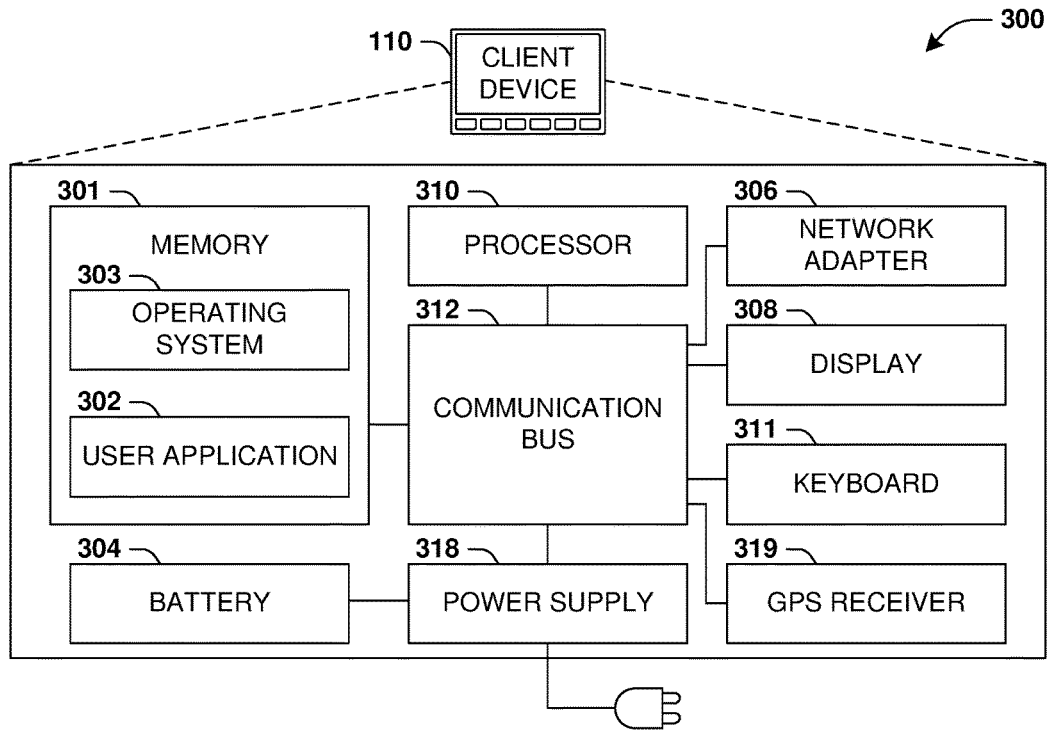
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for displaying content associated with a video element of a video are provided. A video may comprise video elements (e.g., pixels of a frame of the video that depict an entity, such as a person, a place, a thing, an actor, a building, a location, a gadget, a consumer good, a business, a car, etc.) that are tagged with content tags (e.g., user content tags, content tags generated from recognition techniques such as image or voice recognition used to identify entities depicted by video elements). A user may find an entity depicted by a video element as interesting, such as a beach depicted in a beach scene of a romance movie. However, the user may not know what beach is being depicted, and thus may be unable to identify information about the beach that may be interesting to the user (e.g., the user may desire to plan a vacation but is unable to ascertain the identity of the beach depicted in the beach scene, which could otherwise be a vacation destination option for the user).

Accordingly, as provided herein, a content tag, used to tag the video element depicting the beach (e.g., a "Daytona Beach" content tag), may be used to retrieve content (e.g., a vacation planning website with a vacation package to Daytona Beach, user images of Daytona Beach, search results of Daytona Beach from a web search engine, etc.) that can be displayed to the user. In this way, the user is provided with information (e.g., the identification of the beach being the Daytona Beach) and content (e.g., the user images, search results, and vacation package purchase information relating to Daytona Beach) to which the user may otherwise not know how access. The content is provided in an efficient manner, such as within a content interface displayed with the video player interface, so that the user does not have to manually transition away from the video player interface and waste time and computing resources to perform a manual search for information regarding the beach, which may by a time consuming and computing resource wasting trial and error process if the user does not know that the beach is the Daytona Beach.

Figure 4:
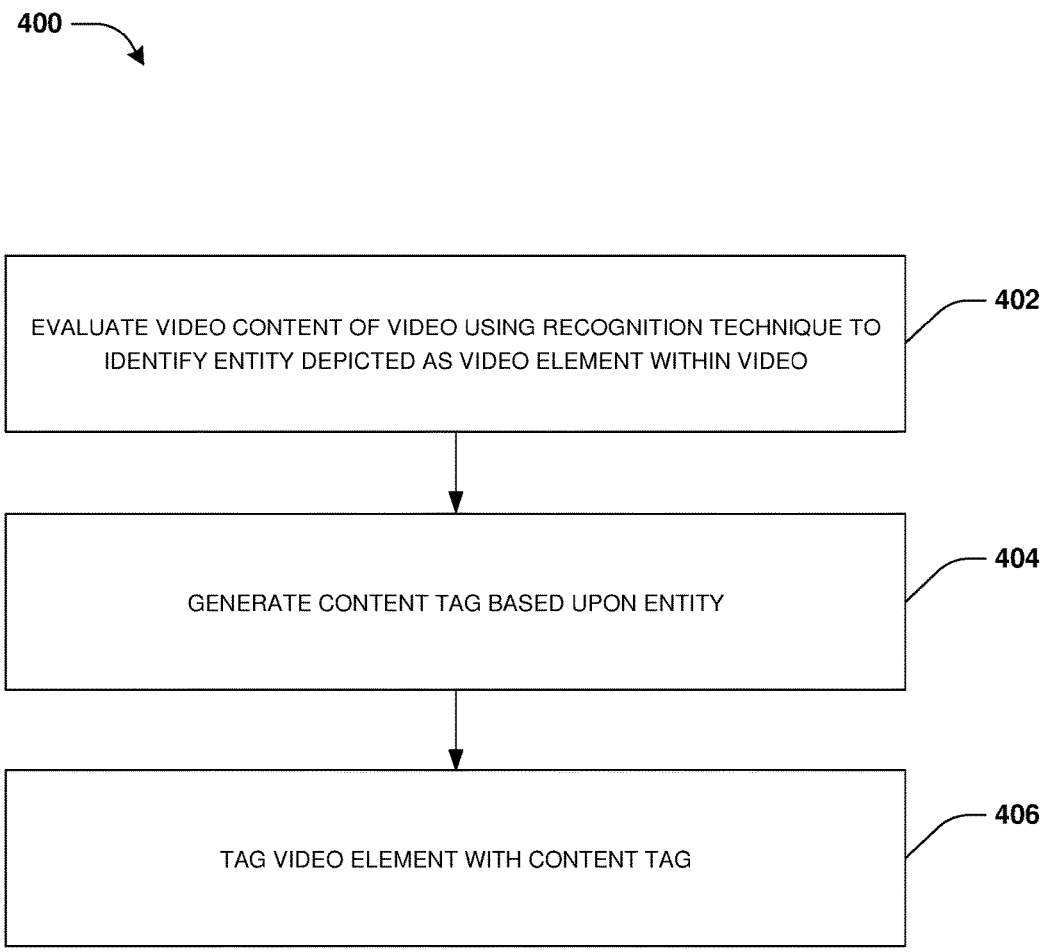
FIG. 4 is a flow chart illustrating an example method for tagging video elements within a video.

An embodiment of tagging video elements within a video is illustrated by an example method 400 of FIG. 4. At 402, video content of a video may be evaluated using a recognition technique to identify an entity depicted as a video element within the video. In an example, the video may correspond to a video file (e.g., a file with a Moving Pictures Expert Group (MPEG) format such as MPEG-4, a file with a Windows Media Audio (WMA) format, a file with a Quicktime format, and/or files with a variety of other video extensions or codecs), and not an image file such as an image file with a Portable Network Graphics (PNG) format. For example, the video file may comprise at least about 1 minute or more of motion. The video file may be played, paused, rewound, fast forwarded, etc. through a video player interface (e.g., a vide player interface with a codec capable of decoding the video file). In an example, the video element may correspond to pixels within a frame of the video that represent or depict the entity (e.g., pixels visually illustrating an actor within a frame of a movie video). The recognition technique may comprise an image recognition technique, a voice recognition technique, or any other technique that can identify features of the video as corresponding to entities. At 404, a content tag may be generated based upon the entity. For example, the content tag may comprise the actor's name that can be used as a search query for subsequently retrieving information about the actor. At 406, the video element may be tagged with the content tag (e.g., the content tag may be stored within metadata of the movie video). In this way, when a user interacts with the video element, the content tag may be used to retrieve and provide content, associated with the entity, to the user (e.g., search results obtained from using the actor's name as a search query to a search engine).

Figure 5:
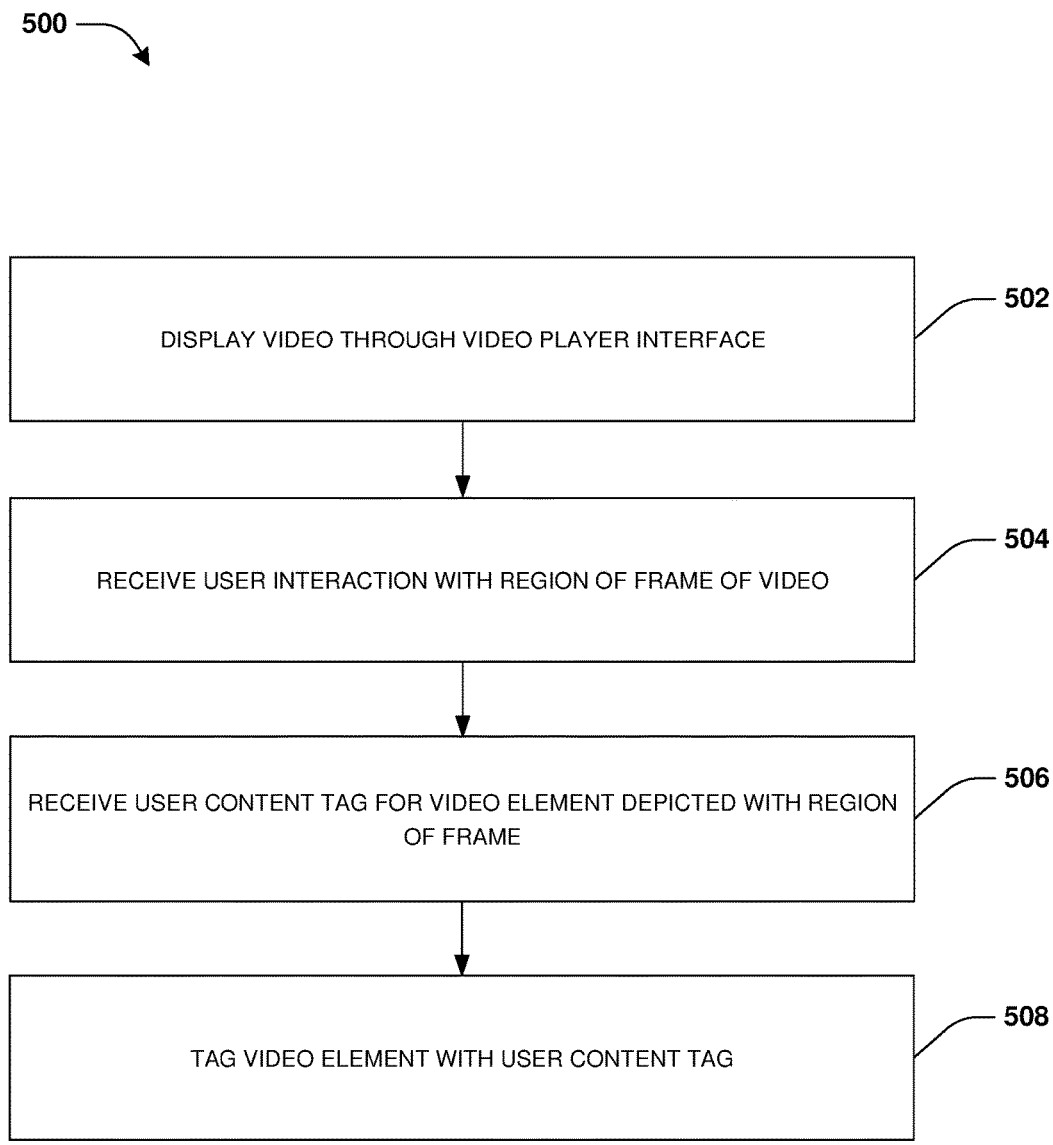
FIG. 5 is a flow chart illustrating an example method for tagging video elements within a video.

An embodiment of tagging video elements within a video is illustrated by an example method 500 of FIG. 5. At 502, a video may be displayed through a video player interface of a computing device (e.g., a user may watch a sports movie on a tablet device). In an example, the video, corresponding to a video file (e.g., and not an image file such as an image file with a PNG format), may be displayed on a mobile device (e.g., a tablet, a wearable device, a smart phone, etc.) that has force touch sensor capable of determining an amount of force or pressure that is applied to a display of the mobile device from a user interaction (e.g., force/pressure applied by a finger; an amount of force/pressure determined by monitoring a contact area of the display upon which an input object such as a finger touches; etc.). In this way, a pressure sensitive gesture may be detected by the force touch sensor, such as where an amount of force/pressure applied by a finger exceeds a threshold of a non-pressure sensitive touch gesture. Accordingly, as provided herein, a new type of interaction is provided for users to interact with videos displayed on mobile devices based upon the pressure sensitive gesture. For example, a user may use a pressure sensitive gesture (e.g., apply a force to the display of the mobile device that is greater than the force of the normal touch gesture) to interact with entities within the video (e.g., a depiction of an actor) in order to view additional information about such entities. In this way, users are provided with greater interactivity and information for entities within a video that are displayed on a mobile device (e.g., a mobile device that does not provide a full desktop interface experience, and thus may otherwise be limited to the types of user interactions and content capable of being displayed through a mobile interface).

At 504, a user interaction with a region of a frame of the video may be received (e.g., the user may perform a gesture, such as a touch gesture or pressure sensitive gesture (e.g., a hard press), over a baseball stadium depicted by the video such as when the video is playing or paused). At 506, a user content tag for a video element depicted within the region of the frame (e.g., a region of pixels depicting/illustrating the stadium) may be received (e.g., the user may input "The Coliseum" into a content tag text input interface). At 508, the video element may be tagged with the user content tag to create an updated video. In this way, when a user interacts with the video element, the content tag may be used to retrieve and provide corresponding content to the user (e.g., a map of The Coliseum and a purchase interface for purchasing tickets).

Figure 6:
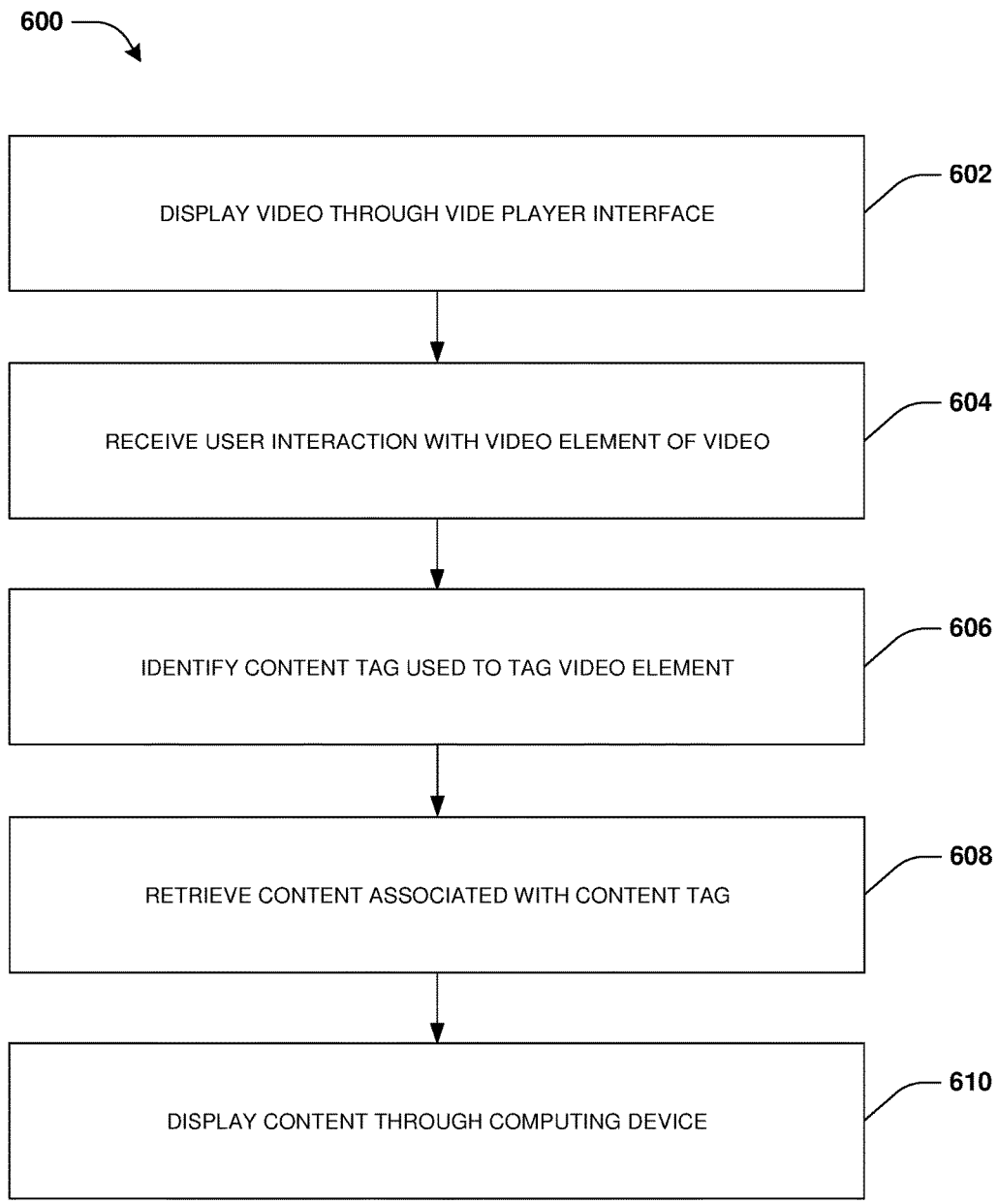
FIG. 6 is a flow chart illustrating an example method for displaying content associated with a video element of a video.

An embodiment of displaying content associated with a video element of a video is illustrated by an example method 600 of FIG. 6. At 602, a video may be displayed through a video player interface of a computing device (e.g., an action movie trailer). The video may comprise one or more video elements (e.g., pixels of a frame depicting an entity, such as a car, an actress, a sword, etc.) tagged with content tags (e.g., textual descriptions that may be used to query content providers for content associated with such entities). At 604, a user interaction with a video element of the video may be received (e.g., while the video is playing or is paused). For example, the user may perform a touch gesture, such as a pressure sensitive gesture (e.g., an amount of force/pressure applied by a user that exceeds a pressure threshold under which the touch gesture may otherwise be determined as a non-pressure sensitive touch gesture), over pixels illustrating the car. At 606, a content tag, used to tag the video element, may be identified such as from metadata of the action movie trailer. For example, the content tag may comprise a textual string "Car Model XYZ".

At 608, content, associated with the content tag, may be retrieved. In an example, a web search may be performed using the content tag as a search query to obtain search results as the content (e.g., links to websites or other search results obtained from a search engine based upon a search query of "Car Model XYZ"). In another example, an image, corresponding to the content tag, may be identified as the content (e.g., a photo sharing service may be queried to obtain user photos having tags corresponding to the Car Model XYZ). In another example, an action, corresponding to the content tag, may be identified (e.g., the ability to test drive the Car Model XYZ). An action completion interface, having the ability to perform the action, may be provided as the content (e.g., a car dealership app through which the user may schedule a test drive). In another example, a social network profile, corresponding to the content tag, may be identified as the content (e.g., a social network profile of a car manufacturer that makes the Car Model XYZ).

In another example, a consumer good, corresponding to the content tag, may be identified (e.g., the Car Model XYZ may be available for purchase through an online car dealer). A purchase interface to purchase the consumer good may be provided as the content. In another example, a location, corresponding to the content tag, may be identified (e.g., a location of a car show at which a new version of the Car Model XYZ will be revealed). A map interface of the location may be provided as the content. In another example, a user context of a user of the computing device may be determined based upon email content (e.g., an email indicating that the user has to write a report on cars), calendar content (e.g., an entry about a car report deadline), location information the user, a user profile (e.g., a social network post "Anyone have information on the Car Model XYZ??? I have a report due soon"), demographic information about the user (e.g., the user may be a 14 year old boy), and/or a variety of other information. A set of content, associated with the content tag, may be identified (e.g., a Car Model XYZ online encyclopedia webpage, a car dealership website, a history of cars article, a link to download a car rental application, etc.). The content may be selected from the set of content based upon the user context (e.g., the Car Model XYZ online encyclopedia webpage and/or the history of cars article may be selected over the car dealership website and the link to download a car rental application because the user context indicates that the user's intent is more likely to be researching the Car Model XYZ as opposed to driving or renting the Car Model XYZ).

At 610, the content may be displayed through the computing device. In an example, the content may be displayed within a content interface. The content interface may completely overlay the video player interface, partially overlay the video player interface, or may not overlay the video player interface (e.g., the content interface may be displayed adjacent or next to the video player interface). The content may be displayed while the video is playing or while the video is paused. In an example, the video may be paused in response to the content interface being displayed. A return to video option, for transitioning from the content interface back to the video player interface for resuming the video, may be provided. In another example, the content interface may be displayed concurrently with the video being played through the video player interface, and the content interface may not overlay the video player interface. In this way, the user may watch the video being played while currently accessing content derived from content tags of the video.

In an example, a save option, for saving a reference to the content (e.g., a bookmark to a website, a task note with a link to the content, etc.), may be provided. In another example, a social network share operation, to create a social network post regarding the content, may be provided (e.g., a social network post comprising a link to the history of cars article). In another example, a communication operation, to send the content through a communication medium, may be provided (e.g., an ability to send an email or a text message with the link to the history of cars article).

In an example, second content, associated with the content tag, may be retrieved. For example, the Car Model XYZ online encyclopedia webpage may be retrieved as the content, and the history of cars article may be retrieved as the second content. The Car Model XYZ online encyclopedia webpage may be displayed through the content interface, and the history of cars article may be displayed through a second content interface, such that the user can concurrently view or switch between the Car Model XYZ online encyclopedia webpage and the history of cars article.

In an example, a second user interaction with a second video element of the video may be received (e.g., the user may perform a touch gesture, such as a pressure sensitive press, over pixels illustrating the actress). A second content tag, used to tag the second video element, may be identified (e.g., "actress Jane Doe"). Second content, associated with the second content tag, may be retrieved. The content, such as the Car Model XYZ online encyclopedia webpage, may be displayed through the content interface and the second content, such as image of actress Jane Doe, may be displayed through a second content interface.

In an example, the user may tag the video with user content tags. For example, a user interaction with a region of a frame of the video may be received (e.g., the user may perform a gesture over pixels illustrating a monument). A user content tag for a target video element depicted within the region of the frame may be received (e.g., the user may input a user content tag "Washington Monument" for the target video element depicting/illustrating the monument within the frame). In this way, the target video element may be tagged with the user content tag to create an updated video. The updated video may be displayed through a second video player interface of a second computing device. A second user interaction with the target video element of the updated video may be received (e.g., a second user may hard press on the depiction of the monument to perform a pressure sensitive gesture). The user content tag "Washington Monument", used to tag the target video element, may be identified. Second content, associated with the user content tag, may be identified (e.g., a news article about the Washington Monument). The second content may be displayed through the second computing device.

Figure 7A:
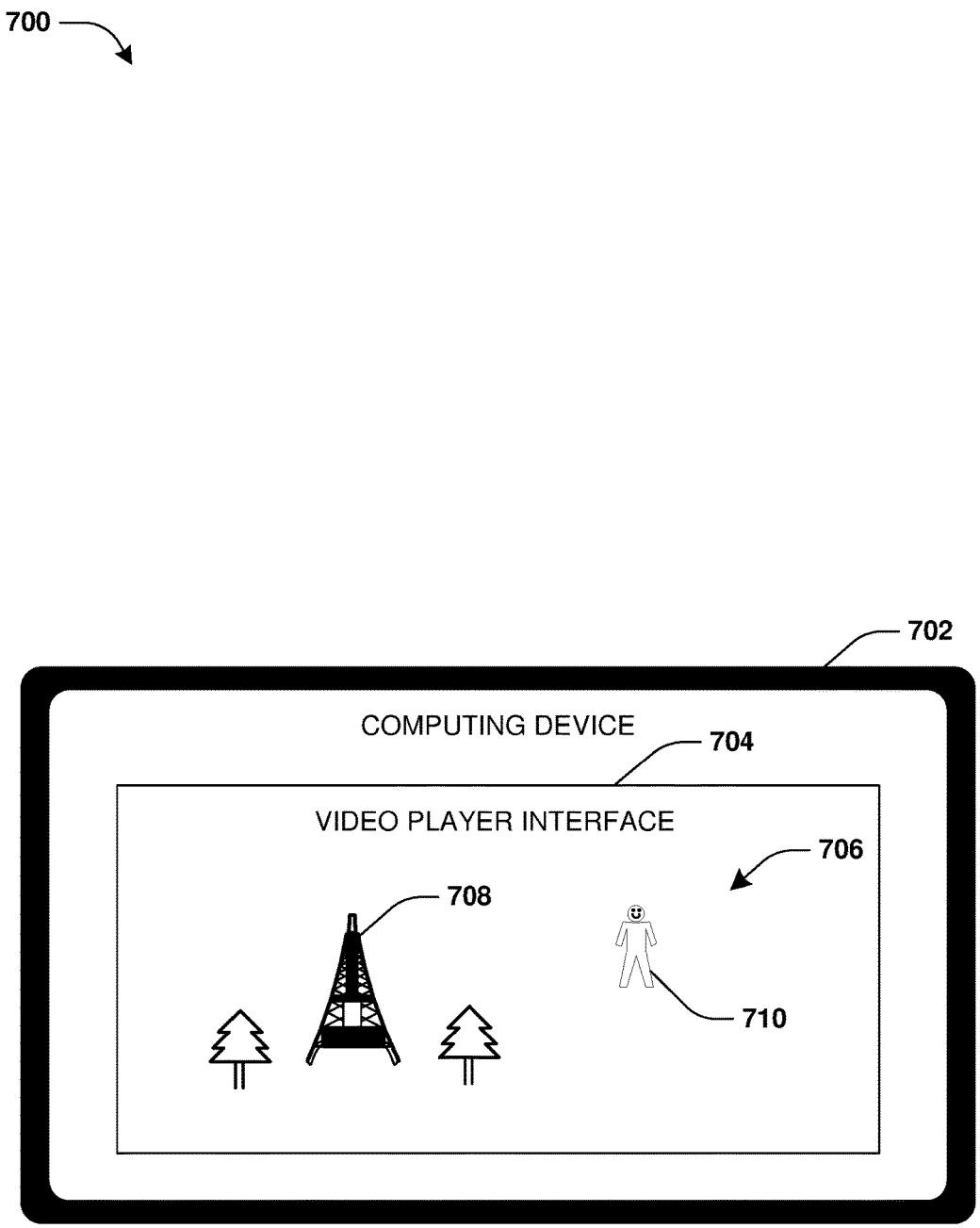
FIG. 7A is a component block diagram illustrating an example system for displaying content associated with a video element of a video, where the video is displayed through a video player interface.
Figure 7B:
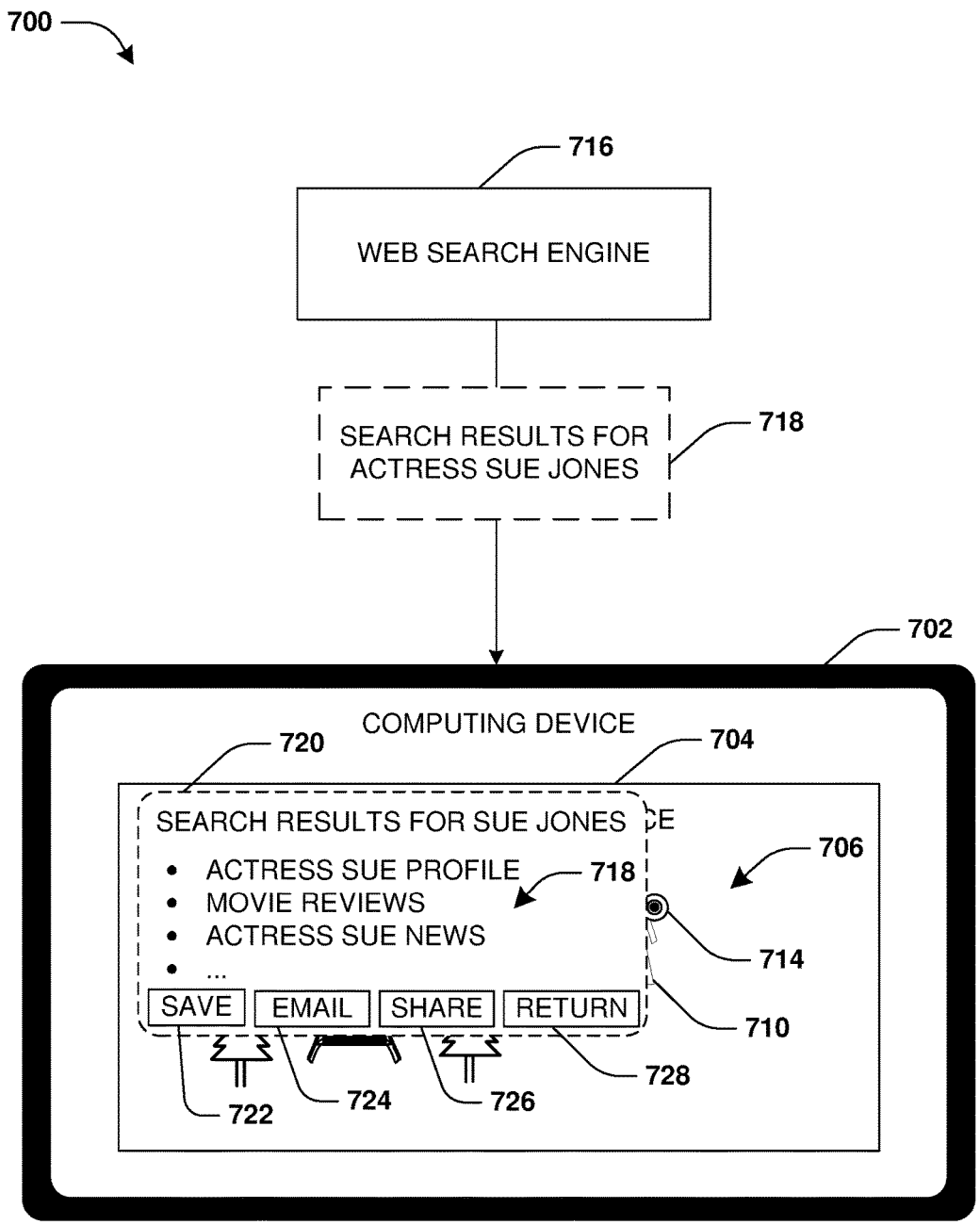
FIG. 7B is a component block diagram illustrating an example system for displaying content associated with a video element of a video, where the content, associated with an entity depicted by a video element of the video, is displayed.

FIGS. 7A and 7B illustrate examples of a system 700 for displaying content associated with a video element of a video. FIG. 7A illustrates a computing device 702, such as a cell phone, a tablet, or any other device, hosting a video player interface 704 capable of playing videos. A user may use the video player interface 704 to access a romance movie video 706. A scene of the romance movie video 706 may comprise an Eiffel Tower video element 708 (e.g., pixels depicting/illustrating an Eiffel Tower within frames of the romance movie video 706) and an actress video element 710 (e.g., pixels depicting/illustrating an actress Sue Jones within frames of the romance movie video 706). The Eiffel Tower video element 708 may be tagged with an "Eiffel Tower" content tag, and the actress video element 710 may be tagged with an "actress Sue Jones" content tag.

FIG. 7B illustrates a user interaction 714 with the actress video element 710 (e.g., the user may select the actress video element 710). The "actress Sue Jones" content tag may be identified for the actress video element 710. Accordingly, the "actress Sue Jones" content tag may be used as a query for a web search engine 716 to obtain search results 718, such as an actress Sue Jones social network profile, a movie review of a movie within which Sue Jones was an actress, news about Sue Jones, etc. The search results 718 may be displayed through a content interface 720. A save option 722 used to bookmark the search results 718, a communication option 724 used to email or communicate the search results 718, a social network share option 726 used to create a social network post based upon the search results 718, and/or a return to video option 728 used to transition back to the romance movie video 706, may be populated within the content interface 720.

Figure 8A:
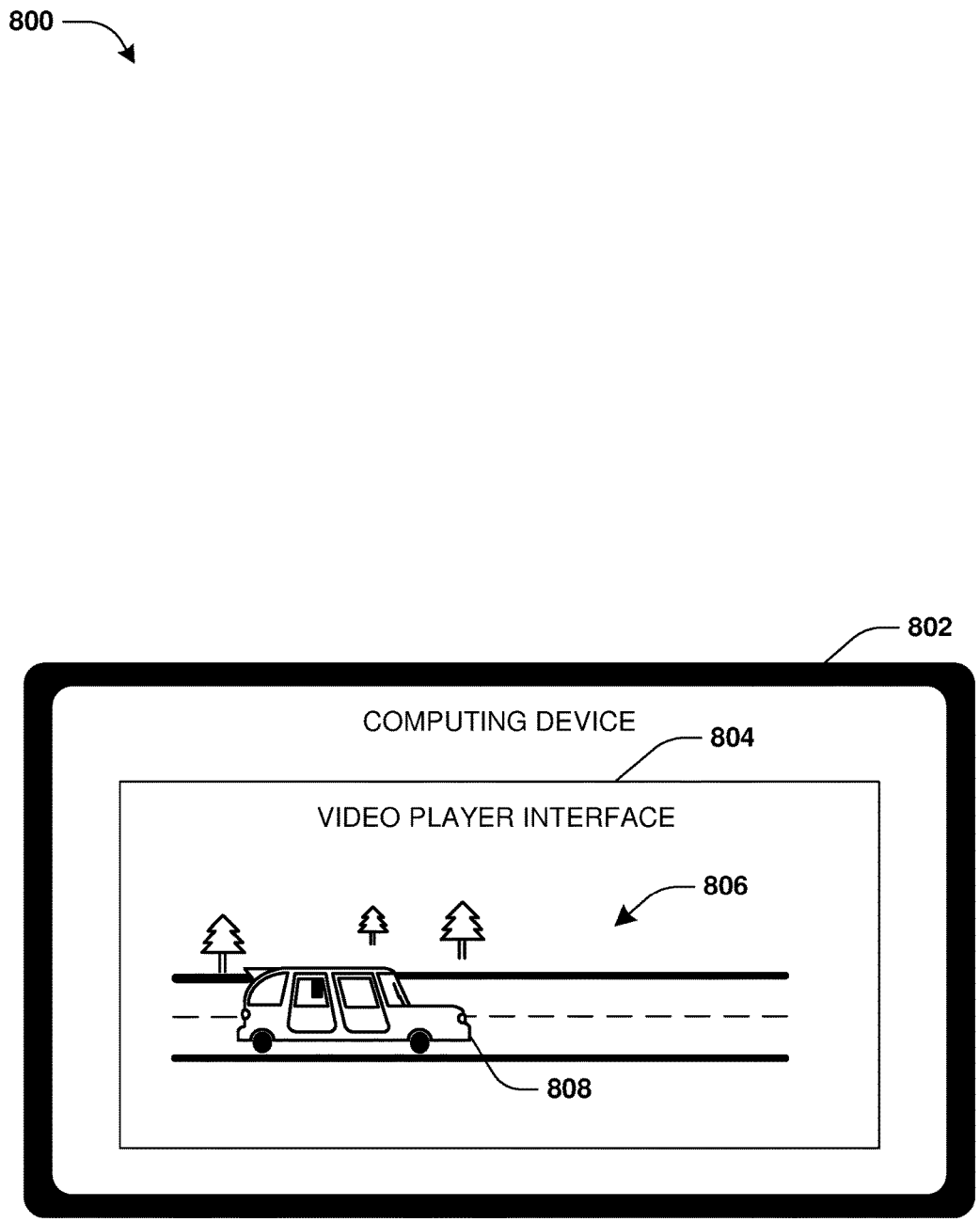
FIG. 8A is a component block diagram illustrating an example system for displaying content associated with a video element of a video, where the video is displayed through a video player interface.
Figure 8B:
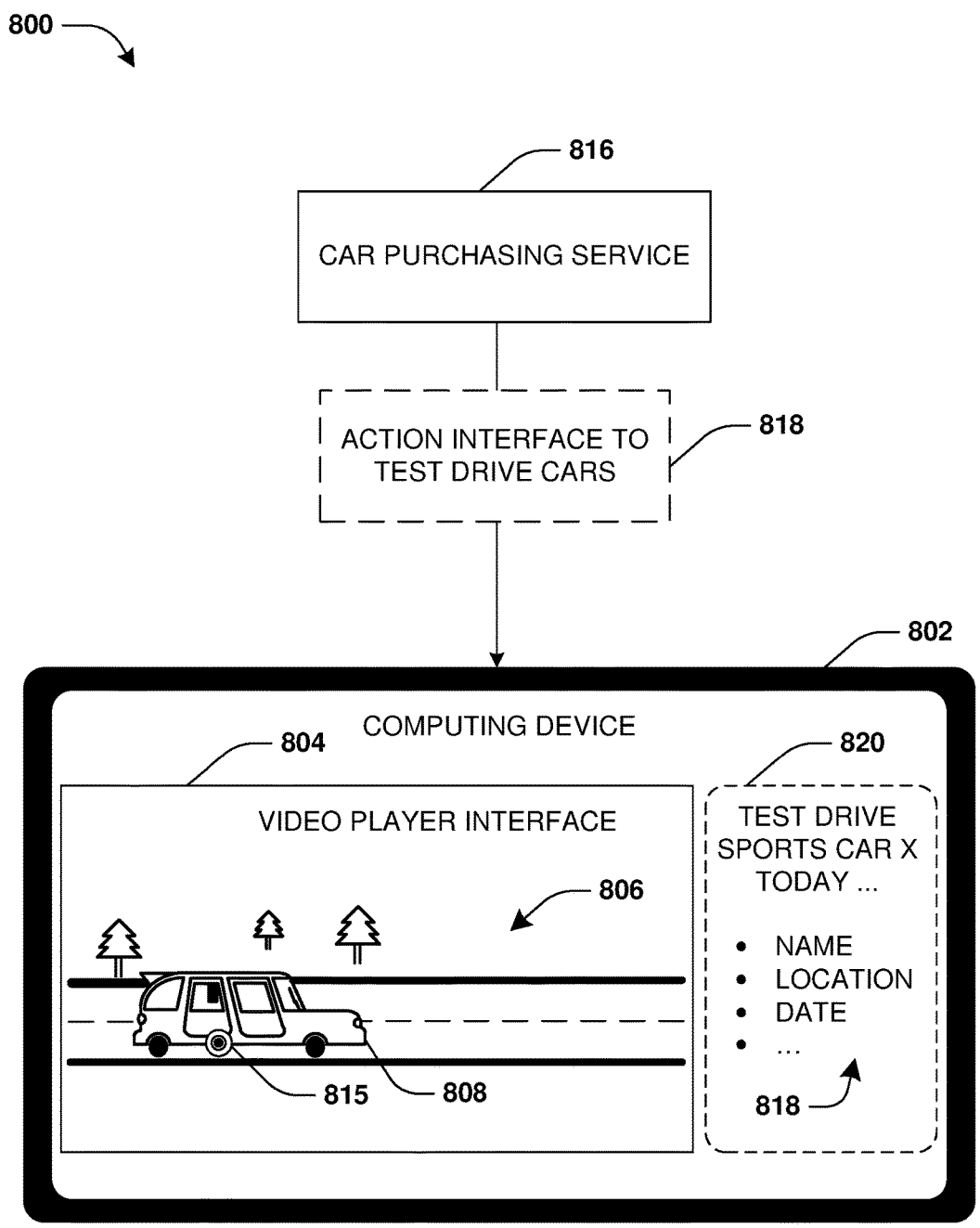
FIG. 8B is a component block diagram illustrating an example system for displaying content associated with a video element of a video, where the content, associated with an entity depicted by a video element of the video, is displayed.

FIGS. 8A and 8B illustrate examples of a system 800 for displaying content associated with a video element of a video. FIG. 8A illustrates a computing device 802, such as a cell phone, a tablet, or any other device, hosting a video player interface 804 capable of playing videos. A user may use the video player interface 804 to access a vacation movie trailer video 806. A scene of the vacation movie trailer video 806 may comprise a car video element 808 (e.g., pixels depicting/illustrating a Sports Car X within frames of the vacation movie trailer video 806). The car video element 808 may be tagged with a "Sports Car X" content tag.

FIG. 8B illustrates a user interaction 815 with the car video element 808 (e.g., the user may select the car video element 808). The "Sports Car X" content tag may be identified for the car video element 808. Accordingly, the "Sports Car X" content tag may be used to identify a car purchasing service 816 hosting an action user interface 818 through which users may schedule test drives for cars. The action user interface 818 may be displayed through a content interface 820. In this way, the user may schedule a test drive for the Sports Car X through the action user interface 818. In an example, the content interface 820 may be display in a non-overlapping manner with respect to the video player interface 804 (e.g., the vacation movie trailer video 806 may continue to play while the content interface 820 is displayed).

Figure 9A:
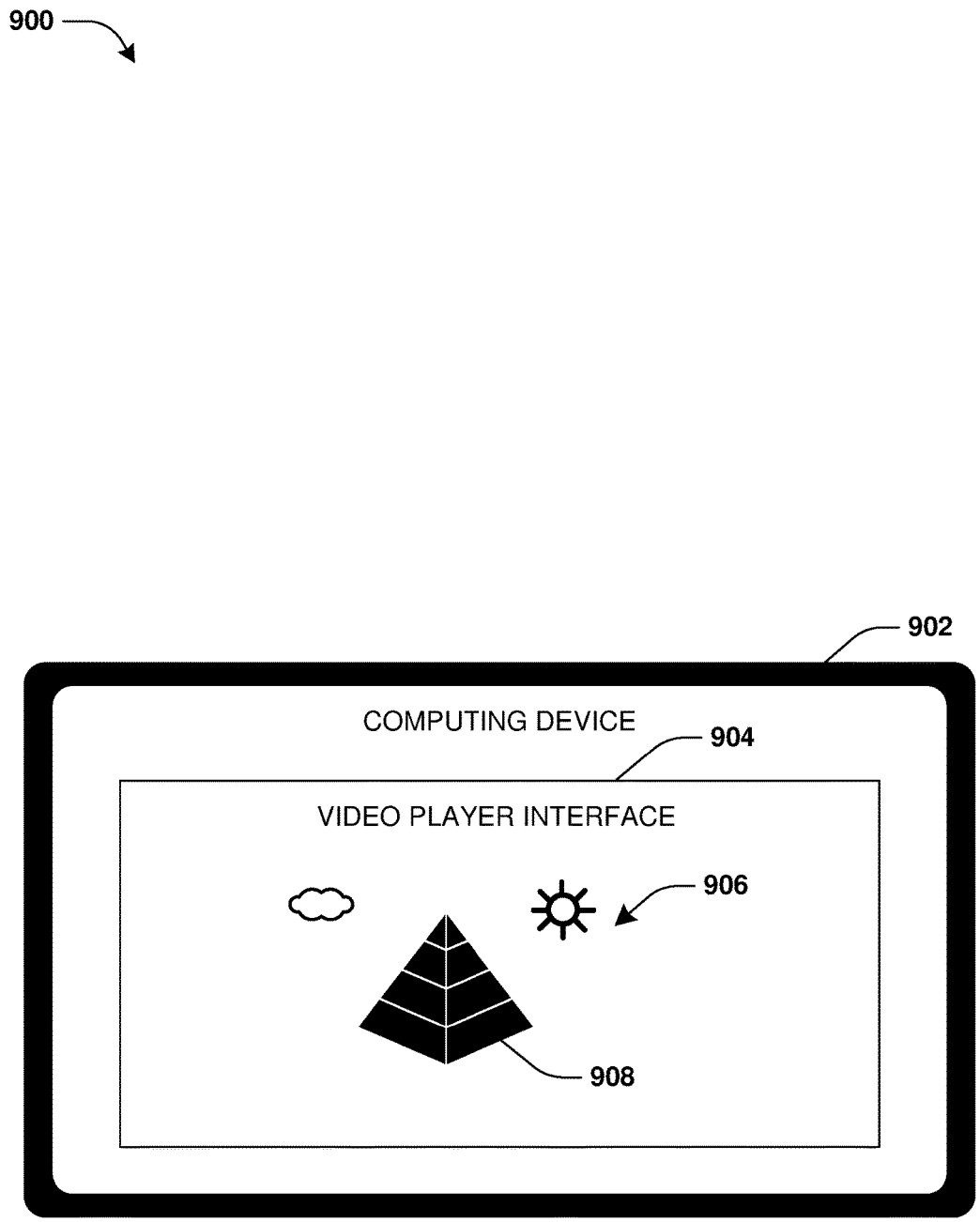
FIG. 9A is a component block diagram illustrating an example system for displaying content associated with a video element of a video, where the video is displayed through a video player interface.
Figure 9B:
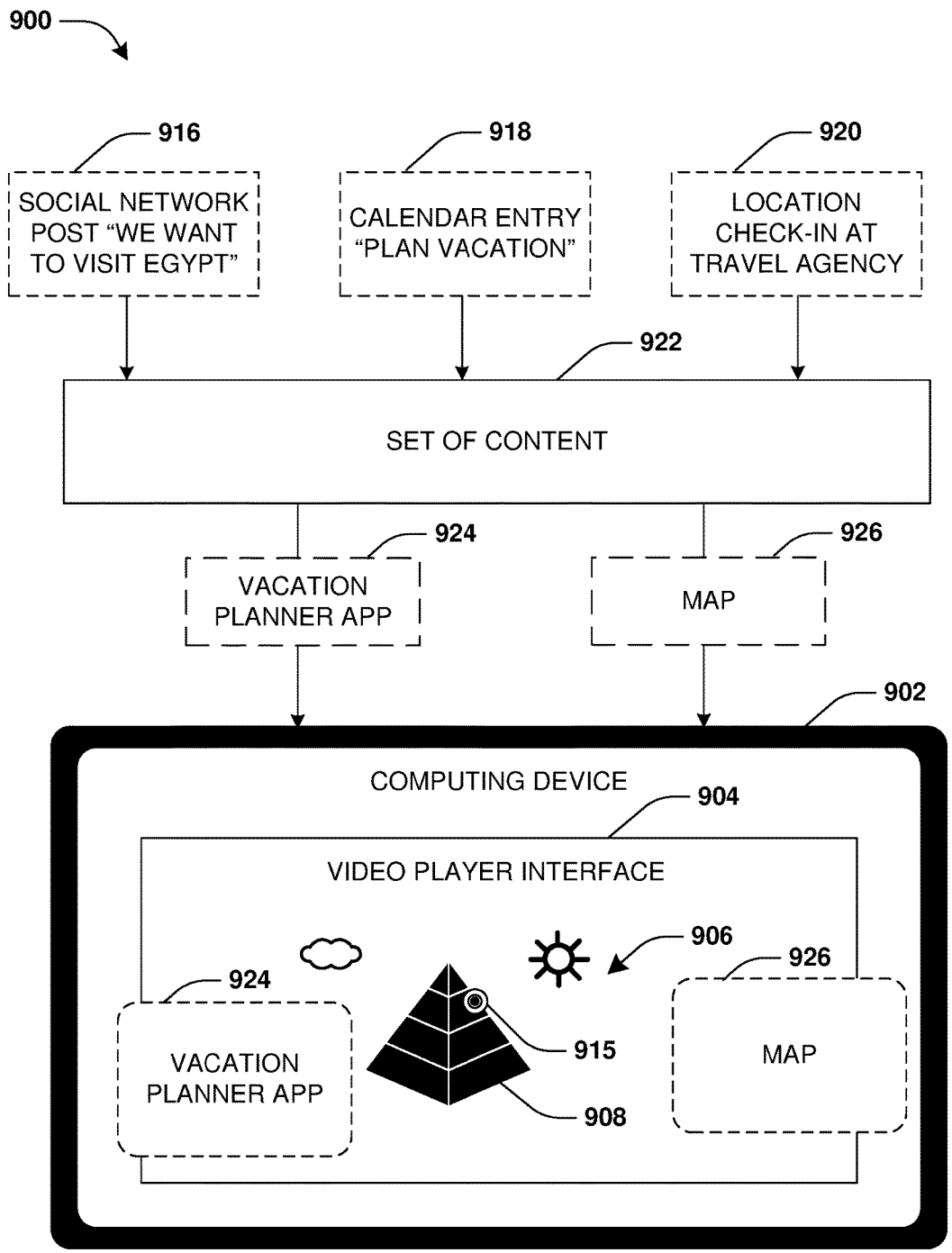
FIG. 9B is a component block diagram illustrating an example system for displaying content associated with a video element of a video, where the content, associated with an entity depicted by a video element of the video, is displayed.

FIGS. 9A and 9B illustrate examples of a system 900 for displaying content associated with a video element of a video. FIG. 9A illustrates a computing device 902, such as a cell phone, a tablet, or any other device, hosting a video player interface 904 capable of playing videos. A user may use the video player interface 904 to access a family vacation movie video 906. A scene of the family vacation movie video 906 may comprise a pyramid video element 908 (e.g., pixels depicting/illustrating a Great Pyramid within frames of the family vacation movie video 906). The pyramid video element 908 may be tagged with a "Great Pyramid" content tag.

FIG. 9B illustrates a user interaction 915 with the pyramid video element 908 (e.g., the user may select the pyramid video element 908). The "Great Pyramid" content tag may be identified for the pyramid video element 908. Accordingly, the "Great Pyramid" content tag may be used to identify a set of content 922 (e.g., a vacation planner app 924, a map 926, a history of Egypt article, etc.). A user context of the user may be identified based upon a social network post 916 "we want to visit Egypt", a calendar entry 918 "plan vacation", a location check-in 920 at a travel agency, etc. For example, the user context may indicate that the user has a strong intent to plan a vacation to Egypt, as opposed to researching Egypt. Accordingly, the vacation planner app 924 and the map 926, but not the history of Egypt article, may be selected from the set of content 922 for display through the computing device 902 because the vacation planner app 924 and the map 926 may be more relevant to the user context of planning a vacation to Egypt than the history of Egypt article.

Figure 10:
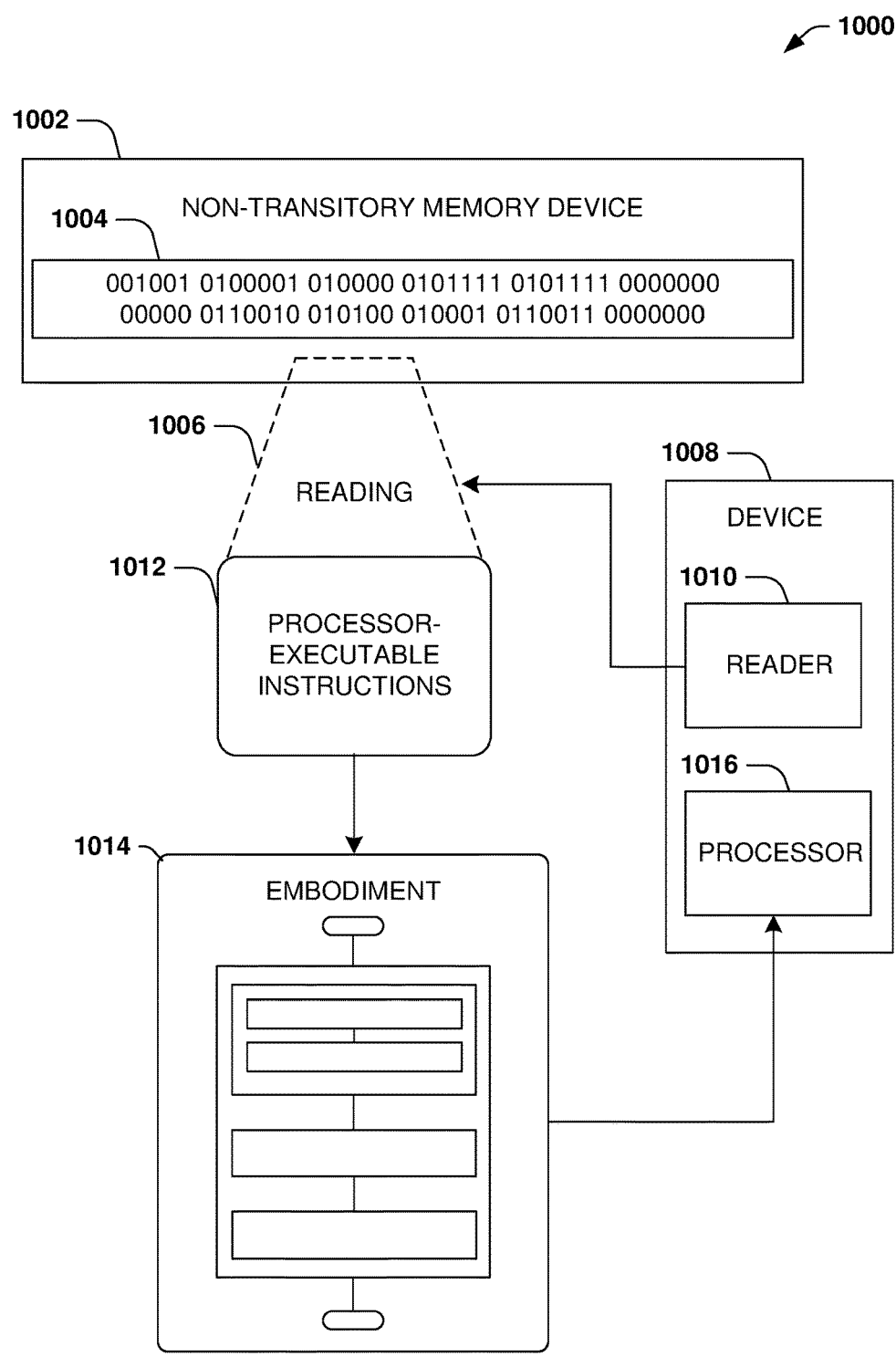
FIG. 10 is an illustration of a scenario featuring an example non-transitory memory device in accordance with one or more of the provisions set forth herein.

FIG. 10 is an illustration of a scenario 1000 involving an example non-transitory memory device 1002. The non-transitory memory device 1002 may comprise instructions that when executed perform at least some of the provisions herein. The non-transitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory memory device 1002 stores computer-readable data 1004 that, when subjected to reading 1006 by a reader 1010 of a device 1008 (e.g., a read head of a hard disk drive, or a read operation invoked on a solid-state storage device), express processor-executable instructions 1012. In some embodiments, the processor-executable instructions, when executed on a processor 1016 of the device 1008, are configured to perform a method, such as at least some of the example method 400 of FIG. 4, at least some of the example method 500 of FIG. 5, and/or at least some of the example method 600 of FIG. 6, for example. In some embodiments, the processor-executable instructions, when executed on the processor 1016 of the device 1008, are configured to implement a system, such as at least some of the example system 700 of FIGS. 7A-7B, at least some of the example system 800 of FIGS. 8A-8B, and/or at least some of the example system 900 of FIGS. 9A-9B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description.

Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for displaying content associated with a video element of a video, comprising:
    displaying a video through a video player interface of a computing device, the video comprising one or more video elements tagged with content tags;
    receiving a user interaction with a video element of the video;
    identifying a content tag, corresponding to a first topic, used to tag the video element;
    retrieving a set of content associated with the first topic;
    determining a user context of a user of the computing device, wherein the user context is indicative of an intention to perform a first action in association with the first topic associated with the content tag;
    determining that first content amongst the set of content has a first level of relevance to performing the first action of the user context in association with the first topic;
    determining that second content amongst the set of content has a second level of relevance to performing the first action of the user context in association with the first topic;
    responsive to determining that the second level of relevance of the second content to performing the first action is lower than the first level of relevance of the first content to performing the first action, selecting the first content but not the second content from the set of content based upon the user context, wherein the selecting comprises selecting an application of the first content but not an article of the second content based upon a determination that the application has a higher level of relevance to performing the first action than the article; and
    displaying the first content but not the second content, within a content interface at least partially overlying the video player interface, through the computing device, wherein the displaying the first content comprises displaying the first content overlying the video.

2. The method of claim 1, comprising:
    displaying a return to video option user interface element for transitioning from the content interface to the video player interface.

3. The method of claim 1, comprising:
    pausing the video in response to the content interface being displayed; and
    providing a return to video option for transitioning from the content interface to the video player interface for resuming the video.

4. The method of claim 1, wherein the set of content comprises at least one of a first map, a first webpage or a first link.

5. The method of claim 1, wherein the set of content comprises at least one of a first webpage or a first link.

6. The method of claim 1, wherein the first content comprises a first map.

7. The method of claim 6, wherein the second content comprises at least one of a second webpage or a second link.

8. The method of claim 1, wherein the displaying the first content comprises:
    providing a save option to save a reference to the first content.

9. The method of claim 1, wherein the displaying the first content comprises:
    providing a social network share option to create a social network post regarding the first content.

10. The method of claim 1, wherein the displaying the first content comprises:
    providing a communication option to send the first content through a communication medium.

11. The method of claim 1, wherein retrieving the first content comprises:
    identifying a social network profile, corresponding to the content tag, as the first content.

12. The method of claim 1, wherein retrieving the first content comprises:
    identifying a consumer good corresponding to the content tag; and
    providing a purchase interface to purchase the consumer good as the first content.

13. The method of claim 1, wherein retrieving the first content comprises:
    identifying a location corresponding to the content tag; and
    providing a map interface of the location as the first content.

14. The method of claim 1, comprising:
    determining the user context based upon at least one of email content, calendar content, location information of the user, a user profile, or demographic information about the user.

15. The method of claim 1, comprising:
    retrieving third content associated with the content tag; and
    displaying the third content through a second content interface.

16. The method of claim 1, comprising:
    receiving a second user interaction with a second video element of the video;
    identifying a second content tag used to tag the second video element;
    retrieving third content associated with the second content tag; and
    displaying the third content through a second content interface.

17. The method of claim 1, comprising:
    receiving a second user interaction with a region of a frame of the video;
    receiving a user content tag for a target video element depicted within the region of the frame; and tagging the target video element with the user content tag to create an updated video.

18. The method of claim 17, comprising:
displaying the updated video through a second video player interface of a second computing device;
receiving a third user interaction with the target video element of the updated video;
identifying the user content tag used to tag the target video element;
retrieving third content associated with the user content tag; and
displaying the third content through the second computing device.

19. A computing device comprising:
a memory containing machine readable medium comprising machine executable code having stored thereon instructions for performing a method; and
a processor coupled to the memory, the processor configured to execute the machine executable code to cause the processor to:
evaluate video content of a video using a recognition technique to identify an entity depicted as a video element within the video;
generate a content tag based upon the entity;
tag the video element with the content tag;
display the video through a video player interface of a computing device;
receive a user interaction with the video element of the video;
identify the content tag used to tag the video element;
retrieve a set of content associated with the content tag;
determine a user context of a user of the computing device based upon a social network post associated with the user, wherein the user context is indicative of an intention to perform a first action in association with a first topic associated with the content tag;
determine that first content amongst the set of content has a first level of relevance to performing the first action of the user context in association with the first topic;
responsive to determining that the first level of relevance of the first content to performing the first action meets a threshold, select the first content from the set of content based upon the user context, wherein the selecting comprises selecting an application of the first content but not an article of second content based upon a determination that the application has a higher level of relevance to performing the first action than the article; and
display the first content, within a content interface, through the computing device.

20. A non-transitory machine readable medium having stored thereon instructions for performing a method comprising machine executable code which when executed by at least one machine, causes the machine to:
display a video through a video player interface of a computing device;
receive a user interaction with a region of a frame of the video;
receive a user content tag for a video element depicted within the region of the frame;
tag the video element with the user content tag to create an updated video;
display the updated video through a second video player interface of a second computing device;
receive a second user interaction with the video element of the updated video;
identify the user content tag used to tag the video element;
retrieve a set of content associated with the user content tag, wherein the set of content comprises at least three of a first application, a first map, a first article, a first webpage or a first link;
determine a user context of a user of at least one of the computing device or the second computing device based upon email content of the user;
select first content from the set of content based upon the user context, wherein the selecting comprises selecting an application of the first content but not an article of second content based upon a determination that the application has a higher level of relevance to performing a first action than the article; and
display, within a content interface at least partially overlying the video player interface, the first content through the second computing device, wherein the displaying the first content comprises displaying the first content overlying the video.

* * * * *